UNITED STATES PATENT OFFICE.

JONAS W. AYLSWORTH, OF EAST ORANGE, NEW JERSEY, ASSIGNOR TO CONDENSITE COMPANY OF AMERICA, OF GLEN RIDGE, NEW JERSEY, A CORPORATION OF NEW JERSEY.

PLASTIC MOLDING COMPOSITION AND METHOD OF PRODUCING SAME.

1,146,299.     Specification of Letters Patent.     Patented July 13, 1915.

No Drawing.     Application filed July 22, 1913. Serial No. 780,453.

*To all whom it may concern:*

Be it known that I, JONAS W. AYLSWORTH, a citizen of the United States, and a resident of East Orange, county of Essex, State of New Jersey, have invented certain new and useful Improvements in Plastic Molding Compositions and Methods of Producing Same, of which the following is a description.

My invention relates to the production of improved compositions suitable for molding, and articles molded therefrom, and my object is to produce such compositions and articles and to devise methods of producing the same.

The compositions referred to comprise cellular, fibrous, or powdered fillers in combination with an improved binding material, combined therewith in a highly effective and novel manner. Such compositions are suitable for molding into desired forms, or for being formed into composite sheets, adapted to be cut or otherwise formed into useful articles.

My improved method relates chiefly to the manner of incorporating the binder with and in the cellular or fibrous filler, or in impregnating fibrous or cellular masses with the binder.

My invention comprises such plastic compositions, composite masses, and processes for forming the same, together with the improved binding material for the same, products of such compositions, and novel and useful sub-processes utilized in the formation of all of the same, as will more fully appear hereinafter. The composite masses and molded articles formed, by virtue of their hardness, strength and high electrical insulating qualities, are adapted for many uses in the arts.

The invention is adapted to form two classes of compositions; one, a composition which requires only to be compressed in heated condition, by which means a compact, hard mass is obtained without any conversion into a non-plastic or infusible state, and the other, a composition which is converted by further reaction under the application of heat or heat and pressure into a non-plastic, infusible and insoluble condition. The first class of compositions are rapid molding, the second class ordinarily require more time in molding, but are better adapted for uses requiring high heat resistance, chemical inertness, high dielectric strength and great mechanical strength.

The improved products which I form, as stated, are, generally speaking, masses comprising filling materials thoroughly impregnated with and bound together by my improved binding material, and the improved binding material itself, which is well adapted for incorporation with filling materials for improved products.

My principal process may be briefly described as the formation of an alkaline solution of a phenolic condensation product, the mixture of the same with a suitable filling body of a fibrous or cellular material, the absorption of the solution by the filling body, and the formation within and about the cells or pores, or about the fibers of the body of precipitates of the condensation product and a salt of the alkali used in the solution. A cellular filling body introduced into an alkaline water solution of the binder is caused to swell and absorb the solution because of the alkaline character of the latter, thus thoroughly introducing the binder within and about the filler. The precipitates which are subsequently formed by the neutralization of the alkali are likewise formed within and about the cells of the filler so that the latter is thoroughly impregnated therewith. The product thus formed may be molded or otherwise formed, as desired. While this process has just been described as applied to the formation of a plastic mass containing filling material, it is obvious that it may equally well be applied to the impregnation of fibrous or cellular material in sheets or masses. Likewise the simultaneous precipitation of the alkali metal or alkaline earth metal salt and the phenolic condensation product as referred to, may be carried out without the concurrent impregnation of a filling body, the resultant intermixed mass being valuable as a binder adapted to be mixed with a suitable filling material or to be used by itself as a plastic composition.

In practising the invention in my preferred manner, I first form a phenolic resin capable of being put in water solution by aid of an alkali metal or alkaline earth metal oxid or hydroxid. By the term "phenolic resin" I mean to include such resins as are made from phenol or the three cresols or such of their derivatives or homologues as are capable of being condensed with formaldehyde to form a resin which is capable of combining with an alkali metal or alkaline earth metal oxid to form a compound soluble in water.

By the terms "alkali metal or alkaline earth metal oxids or hydroxids" I mean to include the oxids or hydroxids of sodium, potassium, lithium, barium, strontium and calcium. Of these the oxids of sodium, potassium and lithium are usually referred to as alkali metal oxids and those of calcium, barium and strontium, as alkaline earth metal oxids. Wherever in the claims however, the term "alkaline oxids" is referred to, I wish the same to be understood to mean oxids or hydroxids of any of the alkali and alkaline earth metals referred to. The phenolic resins referred to are preferably fusible soluble condensation products of a phenol as stated with formaldehyde or its polymers, which products are so formed as to remain fusible and soluble upon subsequent heating without the addition of any hardening ingredient thereto. These resins often contain free phenols of the kind from which the resin was formed, but this is of no disadvantage in my invention. If the permanently fusible type of phenol resin is used, a hardening ingredient may be mixed or dissolved therewith, which hardening agent contains methylene groups in condition to combine with the phenolic resin for the purpose of forming a further reaction, and this methylene-containing agent may be present in such proportions as to produce a non-plastic insoluble final product after its reaction with the phenolic resin, or the methylene-containing agent may be used only in sufficient proportion to form, by reaction with the phenolic resin, an intermediate product between the plastic and non-plastic products. Instead of utilizing the permanently plastic phenolic resin and a hardening agent as stated, a partial phenolic condensation product may be used, which will enter into the alkaline water solution and which is transformed by application of sufficient heat into an infusible non-plastic final product. When the water solution of the phenolic resin has been formed as stated, it may be mixed as such with a fibrous or cellular filler which may also contain various of the non-fibrous fillers or it may also have dissolved therein a sufficient proportion of the hardening agent as stated.

The term "plastic" as used in the specification should be understood as describing a mass which is capable of being shaped or molded by heat and pressure into a compact mass whether or not the initial material constitutes one piece or is formed of many smaller fragments as a comminuted mass. By the term "non-plastic" should be understood a composition which, if comminuted, could not be welded together by heat and pressure to form compact masses equal in strength to the mass before comminution of the same.

Having produced a phenol resin by any of the well known methods, I cause the same to enter into aqueous solution, which I accomplish by stirring the comminuted phenolic resin with the alkali metal or alkaline earth metal oxid or hydroxid in the presence of an amount of water sufficient to make a solution of the desired concentration. The resin may be in a semi-solid or thickly fluid condition if it contains a considerable proportion of free phenol and has not been completely condensed or polymerized by high heat treatment. In this case, it may be dissolved in water with the alkaline substance by the aid of mixing machines.

I have found suitable proportions of the condensation product and alkaline substance for the formation of the alkaline water solution, to be substantially chemically equivalent proportions of the alkaline oxid or hydroxid and the phenol groups which enter into or are contained in the phenol resin, either in condensed or free form. That is to say, in the case of the basic alkali metal oxids, namely, those of sodium, potassium, and lithium, the proportion of the same to the phenol groups used in the formation of the phenol resin is equi molecular. In the case of the alkaline earth metal oxids, namely the oxids or hydroxids of calcium, barium or strontium, the proportions preferably used represent two molecules of the phenol groups which have entered into the phenolic resin to one molecule of the oxid or hydroxid. While these proportions are preferable, an excess of the base may be used, if desired. For example, in conformity with the above proportions, when a permanently fusible and soluble phenol resin is used, in combination with caustic soda, the proportions will be approximately 100 parts phenol resin to 35.9 parts of sodium hydroxid. Or, when similar cresol resin is used 100 parts cresol resin to 34.4 parts of sodium hydroxid.

When an alkaline earth is used, the approximate proportions suitable would be 100 parts phenol resin to 27.4 parts calcium oxid, or 100 parts phenol resin to 50.7 parts strontium oxid, or 100 parts phenol resin to 75.2 parts barium oxid; 100 parts cresol resin to 24.1 parts calcium oxid, or 100 parts cresol resin to 44.5 parts strontium oxid, or 100 parts cresol resin to 65.9 parts barium oxid.

A moderate heat may be used in forming the solution but care must be taken, if an alkaline earth metal oxid is used, not to heat the solution too high, as otherwise the resin will, to a very considerable extent, precipitate.

Having produced the water solution of the phenolic resin, it is then mixed, as stated, with the cellular or fibrous filler which will be referred to in the claims simply as "absorbent filling material", or "filling material", or a "filling body". The water solution thus formed being alkaline, causes the cellular filler to swell by absorption of the solution, thus introducing the binding material within and about the filler so thoroughly that the resultant product is completely impregnated with the desired solution and is not simply coated on the outside of each particle, as is the case in other well known methods.

After the impregnation of the filling body with the solution the mass, in my preferred method, is treated with an acid which is capable of neutralizing the alkali and forming an insulating salt. In the case of the alkali metals, sodium, potassium or lithium, the acid may be stearic acid or palmitic acid or an acid resin such as those contained in colophony or common rosin or an equivalent organic acid. In the case of calcium, barium or strontium, the acid may be sulfuric, oxalic or carbonic. It should be noted that an excess of mineral acid is harmful to the dielectric properties of the product formed and therefore care should be taken to use any of the acids last mentioned in no greater proportion than is necessary to neutralize the alkaline earth metal oxid. In practice, the mineral acid employed would be used in proportion to neutralize the greater part but not quite all of the alkaline earth metal oxid.

The neutralization just described, in the case of either the alkali, or alkaline earth metal oxid or hydroxid and the corresponding acid, results in the formation of a water-insoluble precipitate of the salt of the alkali metal or alkaline earth metal which is formed by neutralization with the particular acid used. Since the filling body is thoroughly impregnated with the alkaline solution, this precipitate will be formed *in situ* within the pores or cells of the filler and about the same. The colloidal phenolic resin is precipitated simultaneously with the alkali metal or alkaline earth metal salt, and since the latter is extremely fine it would tend to flocculate except for the simultaneous precipitation of the phenol resin, which prevents such flocculation. The resin also is precipitated within and about the cells of the filler.

When the alkali metal used is sodium, potassium or lithium, the preferred acid is rosin which may be thoroughly mixed in finely comminuted condition with the filler which has been impregnated with the alkaline water solution as stated. The comminuted mass of rosin and impregnated filler is then heated sufficiently to cause the neutralization and the formation of the precipitates as stated, after which the mass is dried and may be used as a powder, or it may be compressed in convenient slabs or forms preliminary to being molded into final shape. When the alkali is of the class known as an alkaline earth metal oxid, the preferred acid is carbonic acid. This may be applied to the impregnated mass or filler in gaseous form, the gas being absorbed by the moist mixture until the compound of the phenolic resin and the alkaline earth is entirely decomposed, with the consequent formation of the resin precipitate and the extremely fine or deflocculated alkaline earth metal carbonate precipitate *in situ* on the filler and in and about the cells of the filler, if a cellular filler is used.

A useful product is formed by merely impregnating the filler with the alkaline water solution, as stated, without subsequent neutralization of the alkali. This product is not so suitable for insulating purposes as the product formed by neutralization of the alkali and it also is not as plastic as the latter product. It also has a high melting point which, for some uses, is a disadvantage. In the case of the process employing alkaline earths and carbonic acid gas, any excess of the latter which is absorbed in the wet mass will be expelled during the subsequent drying operation. It should also be noted that in case an alkaline earth metal oxid is used, the precipitation of the alkaline earth metal salt and the resin described above may be effected without the use of any added acid. This is accomplished by merely heating the moist mass of impregnated filler and phenolic resin binder for several hours at a temperature of approximately 100° C. in the presence of air. This apparently causes some reaction, the nature of which is not entirely clear, to take place within the mass with the result of neutralizing the alkali and the formation of a stable compound which, when dried, forms a useful molding plastic composition. This neutralization reaction may be accomplished in a comparatively short time, say four hours, and apparently results in the precipitation of the resin and a salt of the base in the same manner as described above in the process employing an acid.

All of the compositions mentioned above are of the first class previously described of permanently plastic substances. To make a composition of the second class, that is one which is adapted to be converted into the non-plastic, insoluble, infusible condition or any intermediate state, it is necessary to add to the alkaline solution of the phenolic resin a body containing methylene groups in condition to combine with the phenolic resin when heated to the reaction temperature. During or after the molding operation of the dried mass, the combination of the added hardening ingredient with the phenolic resin may be effected with the transformation of the mass either into the completely non-plastic insoluble state or to an intermediate state which may be only slightly plastic and partly insoluble in the usual solvents, depending upon the amount of methylene-containing body used.

An example of a composition of the first class made in accordance with the above specification is as follows: 100 parts of phenolic resin are mixed, cold or slightly warm with a milk of lime formed by the hydration of from 24 to 28 parts of calcium oxid with from 300 to 600 parts of water. The mixing is continued until the phenolic resin has completely entered into solution which takes from twelve to thirty-six hours, depending upon the condition of the resin and the amount of agitation or stirring. The solution is then thoroughly mixed with from 70 to 300 parts of filling material, which may be wood flour, asbestos fiber, cotton flocks, or any of the well known inert powdered fillers or mixtures of the same. After mixing and the absorption of the solution by the filler, the moist mass is exposed to carbon-di-oxid gas until the mass is neutralized which may be determined by suitable indicative tests or may be noted by observing the cessation of absorption of the gas by the mass. The mass is then dried and may be subsequently molded in closed molds or it may be compressed into slabs or other suitable forms, previous to molding in open or flash molds by heat and pressure.

As an example of a composition of the second class, the aqueous solution of the phenolic resin may be made in the same manner as in the example just given, and from 5 to 16 parts of hexa-methylene-tetra-amin or other agent containing methylene groups in condition to combine with the phenolic resin, added thereto. The proportion to be used varies, depending upon the nature of the phenolic resin used, and the amount of free phenols which it contains which may readily be ascertained by analysis. The composition of the second class is formed in the same manner as the example of the composition of the first class given and may be hardened to infusibility either during or after the molding of a desired article therefrom.

Among the advantages of the process described it may be noted that the same permits the use of a water solution in forming a plastic composition of the character described, whereas under the usual practice heretofore, the ingredients of such a composition have been dissolved in alcohol, which is a much more expensive method. The alkaline solution also causes a much more thorough impregnation of the filler than is possible with alcohol. The presence of the finely divided deflocculated alkali, or alkaline earth, metal precipitate in the binding material used is also of considerable advantage, since in the case of a mixture of filling and binding material its presence prevents the filtration or separation of the binder from the filler when the composition is in plastic condition and is submitted to high pressure in molding. A stronger and smoother product is also formed by this means. Products formed by my invention are particularly adapted to be used for objects which are to have impressions formed thereon, and particularly as the base or backing of such objects, such for example, as phonographic record disks or blanks, printing plates and the like. In such cases a printing plate, phonographic record or other impressible object may have a phenolic condensation product surface which takes the desired impression and is subsequently hardened. The backing or base of the record or plate is formed preferably of a fusible condensation product binder, an inert filler and the finely divided deflocculated alkali, or alkaline earth, metal salt, the condensation product and alkali metal salt being formed by precipitation in and about the cells of the filler if a cellular filler is used, and the filler thus impregnated being thoroughly distributed through and bound together by a mass of the precipitated phenolic resin and alkali metal salt. A backing so formed will yield sufficiently to pressure during the formation of the molded or impressed article, and, as stated, the combination of ingredients therein prevents the filtration or separation of the binder from the filler during the making of the impression.

Having now described my invention what I claim as new and desire to protect by Letters Patent is:—

1. The process of forming a plastic composition, which comprises forming an alkaline water solution of a phenolic condensation product, causing the same to be absorbed by filling material, treating with a neutralizing agent and forming precipitates of the condensation product and a salt of the alkali within and about the filling material.

2. The process of forming a plastic composition, which consists in stirring a comminuted phenolic resin with water and an alkaline substance capable of causing the said resin to go into aqueous solution, until said solution is formed, mixing with an absorbent filling material and causing the latter to become impregnated with the solution, and causing the neutralization of the alkali in the solution and the precipitation of a salt of the alkali, and the said resin, within and about the said material.

3. The process of forming a plastic composition, which consists in forming an alkaline water solution of a resinous binder, causing the same to impregnate an absorbent filler, and causing the neutralization of the alkali in the solution with the consequent precipitation of a salt of the alkali, and the binder, in and about the filler.

4. In the process of forming a plastic composition, the step which comprises mixing a fusible phenolic condensation product, and an alkaline oxid in substantially equimolecular proportions of the alkaline oxid and the sum of the phenol groups which entered into the said condensation product or are contained therein, and water, and forming a water solution of the same.

5. The process of forming a plastic composition, which comprises forming an alkaline earth water solution of a fusible soluble phenolic resin and a body containing methylene groups in condition to combine therewith in a hardening reaction on sufficient application of heat, and causing the same to thoroughly impregnate an absorbent filling material.

6. The process of forming a plastic composition, which consists in causing filling material to absorb an alkaline solution of a fusible soluble phenolic resin and a body containing methylene groups in condition to combine therewith, on application of heat, causing neutralization of the alkali in the solution, and the precipitation of a salt of the alkali, and a mixture of the said resin and body, within and about the said material.

7. In the process of forming a plastic composition, the step which comprises forming an alkaline earth water solution of a fusible soluble phenolic resin and a methylene-containing hardening agent therefor.

8. The process of forming a plastic composition, which comprises mixing together a fusible soluble phenolic condensation product, an alkaline oxid, and water, and thereby forming a water solution of the same, neutralizing the alkali in the solution with a suitable acid, and precipitating simultaneously a finely-divided water-insoluble salt of the alkali and the said condensation product.

9. The process of forming a plastic composition, which comprises mixing together a fusible soluble phenolic condensation product, an alkaline oxid, and water, and thereby forming a water solution of the same, and causing the simultaneous precipitation of a finely divided, water-insoluble salt of the alkali and the said condensation product, and drying the mass.

10. The process of forming a plastic composition, which consists in mixing together a resinous binder, an alkaline substance, a filling body, and water, forming an alkaline water solution of said binder, causing the simultaneous precipitation of a water-insoluble salt of the alkali and the binder in and about the filling body, and drying the mass.

11. As a new composition of matter, a mixture comprising a phenolic condensation product and a finely divided, deflocculated water-insoluble salt of an alkaline earth metal.

12. As a new composition of matter, a mixture comprising an absorbent filler, a phenolic condensation product and a finely divided, water-insoluble alkaline earth metal salt, said filler having said product and salt within and about its cells or fibers, and said impregnated filler being thoroughly distributed through and bound together by the mass of said product.

This specification signed and witnessed this 7th day of July 1913.

JONAS W. AYLSWORTH.

Witnesses:
FREDERICK BACHMANN,
WILLIAM A. HARDY.